United States Patent [19]

Agrawal et al.

[11] Patent Number: 5,465,389
[45] Date of Patent: Nov. 7, 1995

[54] METHOD OF PRIORITIZING HANDOFF PROCEDURES IN A CELLULAR SYSTEM

[75] Inventors: Prathima Agrawal, New Providence; Dinesh K. Anvekar, North Plainfield; Balakrishnan Narendran, New Providence, all of N.J.

[73] Assignee: AT&T Corp., Murray Hill, N.J.

[21] Appl. No.: 201,601

[22] Filed: Feb. 25, 1994

[51] Int. Cl.⁶ .................................................. H04B 7/26
[52] U.S. Cl. ........................ 455/33.2; 455/56.1; 379/60
[58] Field of Search ........................... 453/33.2, 33.4, 453/54.1, 56.1, 54.2; 379/59, 60, 63

[56] References Cited

U.S. PATENT DOCUMENTS 4,794,635  12/1988  Hess ....................................... 455/33.3
5,289,525  2/1994  Issenmann et al. ..................... 455/33.2
5,301,356  4/1994  Bodin et al. ........................... 455/56.1 X

FOREIGN PATENT DOCUMENTS 2262688  1/1993  United Kingdom.

Primary Examiner—Edward F. Urban
Attorney, Agent, or Firm—Michele L. Conover; Kenneth M. Brown

[57] ABSTRACT

A method of prioritizing handoff requests in a cellular system is disclosed in which at least one handoff request for assignment of a communication channel is received from at least one mobile unit. A cutoff time for the handoff request is determined. The handoff requests are arranged in a priority queue based on the cutoff time associated with each handoff request. Available communication channels are assigned to the mobile units requesting handoff in the order of the queue.

9 Claims, 4 Drawing Sheets

METHOD OF PRIORITIZING HANDOFF PROCEDURES IN A CELLULAR SYSTEM

BACKGROUND OF THE INVENTION

The present invention is directed to a method of performing handoff procedures in a cellular communication system and, more particularly, to a method of prioritizing handoff procedures in a cellular system to reduce handoff failure.

A typical cellular communication system comprises a plurality of cells, each of which accommodates a number of mobile units within a predetermined geographical area. Each cell includes a base station which assigns to each mobile unit located in the cell a different communication channel for transmitting and receiving signals. Handoff procedures govern communications when a mobile unit leaves a first cell and enters a contiguous area associated with a second cell. When the mobile unit leaves the first cell, the communication channel assigned to the particular mobile unit is relinquished by the first base station, also referred to as the "old" base station, and a new communication channel is assigned to the mobile unit by the second base station, also referred to as the "new" base station.

A problem in performing handoff procedures is the availability of communication channels in the new cell. Typically, an overlapping region, also referred to as a handoff region, can be thought to exist between each pair of adjacent cells. In the handoff region, either base station may control signal transmission to and from the mobile unit. However, by the time the mobile unit exits the overlapping region, the new base station associated with the cell in which the mobile unit has entered must be able to facilitate continued signal transmissions by assigning a communication channel to the mobile unit. Many times, more than one mobile unit may be seeking to enter a new cell in which less than the necessary communication channels are available. As such, some of the mobile units may not be assigned communication channels by the new base station, resulting in a loss of signal transmission. Such a condition is referred to as handoff failure.

In some known cellular systems, the mobile unit continually monitors the signal strength of the base stations located in neighboring cells by monitoring a pilot signal transmitted by each base station. When the strength of the pilot signal exceeds a certain threshold, a handoff occurs. In other cellular systems, the base station monitors the signal strength of the mobile unit's signals to determine when handoff should occur. These methods tend to assign available channels to the mobile units in the order in which the handoff requests are received. Factors, such as the velocity at which the mobile unit is entering a handoff region, are not taken into account. As a result, a situation may arise in which a first mobile unit enters the handoff region and is travelling at a slower speed than a second mobile unit. If the new base station has only one channel available, according to the above-described method, the first mobile unit will be assigned the channel. If the second mobile unit exits the handoff region prior to another channel becoming available, the second mobile unit will no longer be able to transmit to the old base station associated with the cell it is leaving, resulting in handoff failure and a complete loss of service to the second mobile unit. Such a situation may arise even if the mobile units are travelling at the same speed because the second mobile's trajectory of motion, i.e. direction of travel, through the handoff region caused it to exit the handoff region earlier than the first mobile unit.

Cellular communication services is a very competitive business, and any invention that would reduce unintended service cutoffs to the customer would be of great benefit and value.

SUMMARY OF THE INVENTION

In accordance with the present invention, the problem of handoff failure is reduced by establishing a priority queue for determining the order in which handoffs should occur so that mobile units recognized to have a smaller time before service cutoff ("cutoff time") are given a higher priority in the assignment of a communication channel.

Mobile units identified to be in a handoff region formed by two adjacent cells and projected to travel from an old cell into a new cell are monitored to determine for each mobile unit the cutoff time at which a handoff should occur. For example, the power level of the base station associated with the old cell is periodically sampled by the mobile unit and a determination is made of the rate of change at which the power level is decreasing to establish the cutoff time. The power level decreases as the distance between the mobile unit and the old base station increases. The rate of change of power level is proportional to the relative velocity at which the mobile unit is travelling directly away from the old base station. Mobile units determined to have a smaller cutoff time are given a high priority in the priority queue and assigned the first available communication channels which reduces the number of unintended cutoffs.

DETAILED DESCRIPTION

For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processors (DSPs), such as the AT&T DSP16 or DSP32C, and software performing the operations discussed below. Very large scale integration (VLSI) hardware embodiments of the present invention as well as hybrid DSP/VLSI embodiments may also be provided.

Figure 1:
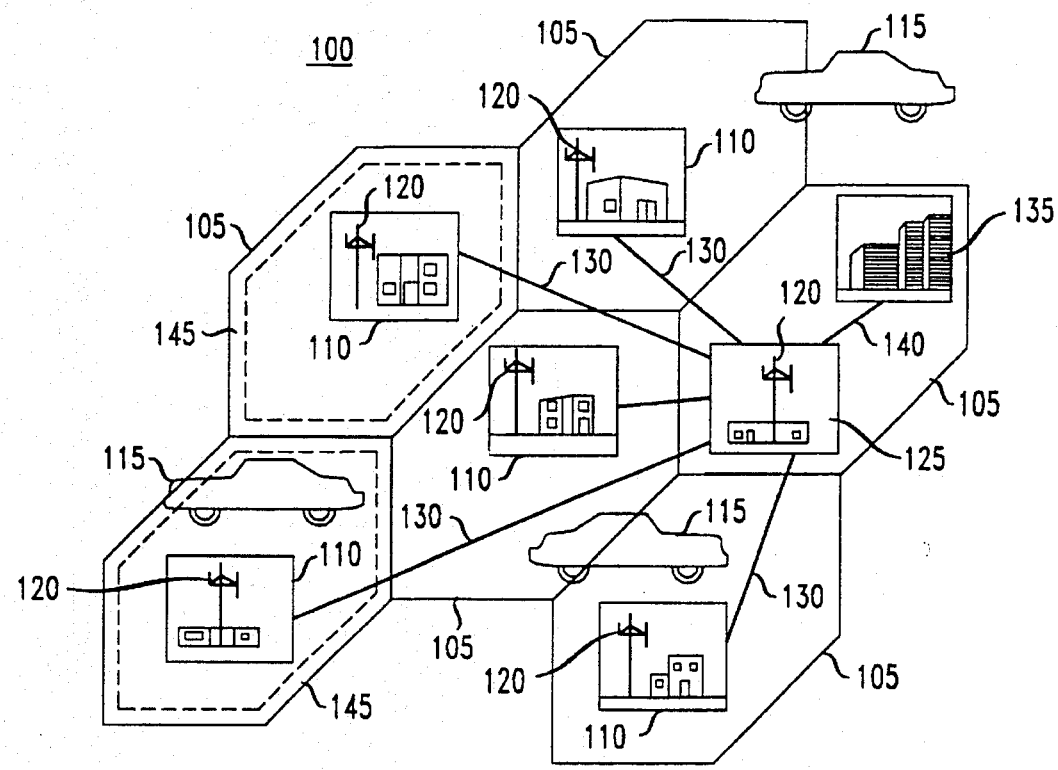
FIG. 1 is an illustrative diagram of a typical cellular system.

FIG. 1 is an illustrative cellular arrangement which is typically used in a cellular communication system 100. The cellular arrangement comprises a plurality of cells 105, illustratively hexagonal in shape, each of which covers a particular geographical area. A base station 110 includes a directional antenna 120 which relays signals to and from mobile units 115 located within the cell 105. A mobile telephone switching office (MTSO) 125 is connected to all of the base stations 110 of a group of cells 105 by a cable 130. The MTSO 125 is also connected by cable 140 to a fixed public switching network 135 or other similar network.

A fixed number of communication channels is allocated to each base station 110, and one channel is assigned to each of the mobile units 115 travelling within the corresponding cell 105. According to known frequency reuse principles, different communication channels are allocated to adjacent cells within a given perimeter to minimize signal interference. As a result, when a mobile unit 115 travels from one cell to another, the mobile unit must be assigned a new communication channel by the base station for the cell in which it is entering (the "new" cell).

Figure 2:
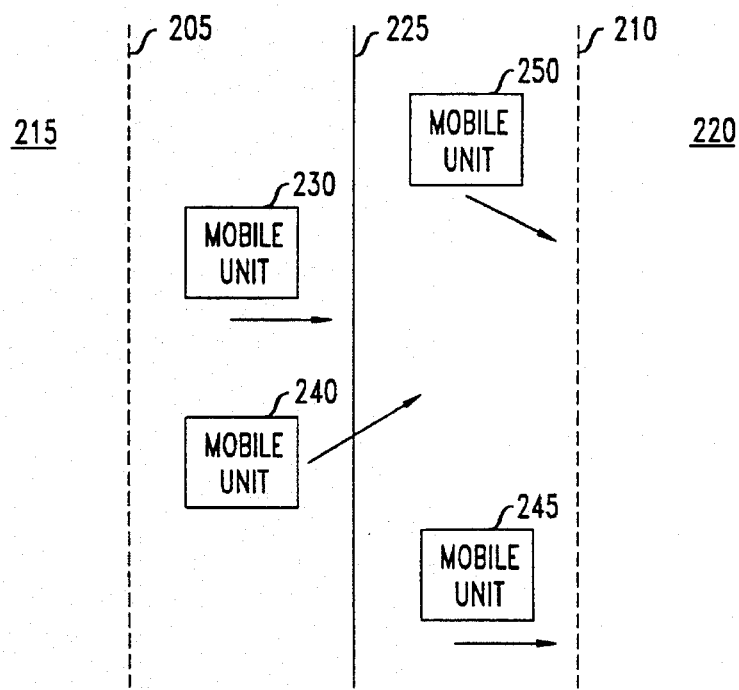
FIG. 2 is an illustrative diagram of a handoff region formed by two adjacent cells in the system of FIG. 1.

An overlapping region or handoff region 145 exists between adjacent cells. Mobile units located in the handoff region 145 communicate with the base stations located in each of the adjacent cells. FIG. 2 is an enlarged view of the handoff region 145 depicted in FIG. 1. Dashed lines 205 and 210 indicate the boundary lines of the handoff region. For purposes of explanation, dashed line 205 is contained in a first cell 215 and dashed line 210 is contained in a second cell 220. The central solid line 225 illustrates the actual boundary line between the first cell 215 and the second cell 220. Once a mobile unit has entered the handoff region 145, a handoff request is initiated to the base station controlling the cell in which the mobile unit is entering. For example, if mobile unit 230 were travelling from the first cell 215, also referred to as the "old" cell, to the second cell 220, also referred to as the "new" cell, a handoff request would be transmitted by the mobile unit 230 to the base station controlling the second cell 220.

In many instances, mobile units entering from different neighboring cells will be requesting the assignment of a communication channel from the base station of the new cell. In accordance with the invention, a determination is made as to which mobile unit will exit the handoff region first and therefore should be the first to be assigned a new channel. For example, the speed of the mobile unit and the direction in which the mobile unit is travelling will affect the amount of time the mobile unit is in the handoff region. In accordance with the present invention, a method is described below for establishing a priority queue for determining the order in which mobile units within the handoff region 145 are assigned available communication channels. A cutoff time is established for each mobile unit which represents the time at which handoff failure will occur if no channel is assigned to the mobile unit by the new base station. The cutoff time is determined by measuring the power level received by the mobile unit and transmitted to the new base station and the rate of change of the power level. The detected power level is generally inversely proportional to the distance between the mobile unit and the old base station, i.e. the power level decreases as the distance between the mobile unit and the old base station increases. The exact nature of the variation of the power level depends on the characteristics of the radio transmission involved. However, for the handoff region which is located at the boundaries of the cells, the rate of change of the power level is a function of the velocity at which the mobile unit is travelling away from the old base station. These measurements are received by the new base station which performs the necessary computations for determining the cutoff time. The unit with the shortest cutoff time is given highest priority.

Figure 3:
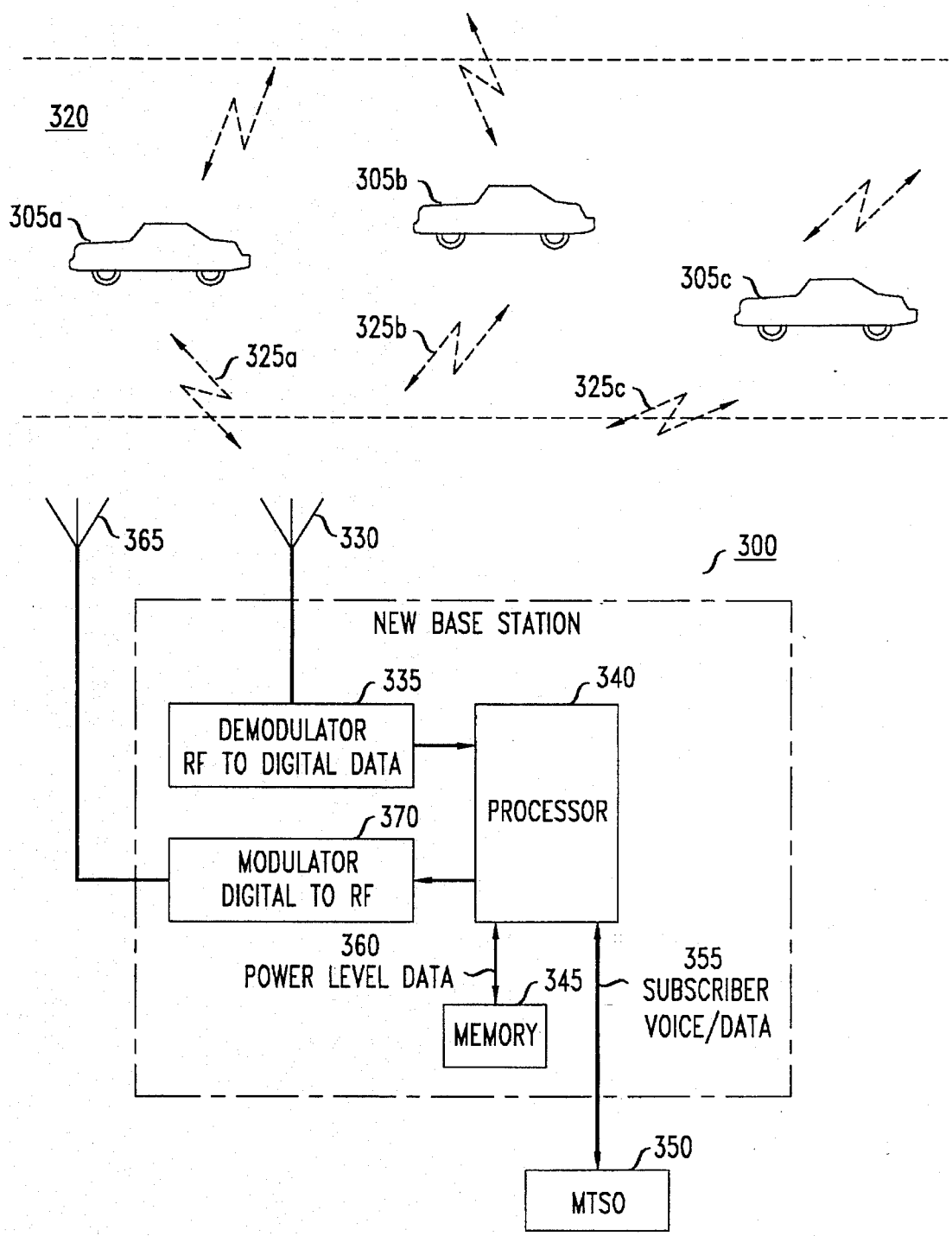
FIG. 3 is an illustrative block diagram showing an illustrative embodiment of the present invention.

FIG. 3 illustrates a block diagram of a base station 300 of a cell which is receiving channel assignment requests from a plurality of mobile units 305a, 305b, 305c located in handoff region 320. Each mobile unit requesting a new channel assignment transmits radio frequency (RF) signals 325a, 325b, 325c. Included in the RF signals is data indicative of the power level detected by the mobile unit and transmitted from the old base station of the cell it is leaving (not shown). Each mobile unit 305a, 305b, 305c preferably samples the power level transmitted by the old base station on a periodic basis, e.g. every 500 milliseconds and transmits them to base station 300. Base station 300 receives the sampled power level readings and computes the rate of change of the power levels as described in detail below.

Antenna 330 of base station 300 receives the RF signals transmitted by each of the mobile units 305a, 305b, 305c. A demodulator 335 converts the RF signals to digital data. The digital data includes, among other things, the power level data described above, voice data, and control data. A processor 340 receives the digital data and extracts the power level data from the voice and control data. The power level data is stored in memory 345. The voice data are transmitted over lead 355 to a MTSO 350 which determines the destination of the data. Periodically, the processor 340 retrieves the power level data for a particular mobile unit and determines from it the cutoff time at which the mobile unit will leave handoff region 320 as will be described in detail below. A higher rate of change of power, for example, would normally result in a shorter cutoff time. Prior to the cutoff time, a new channel must be assigned to the mobile unit to avoid termination of communications to the mobile unit. A determination of cutoff time is made for each mobile unit. A priority queue of the mobile units is established by the new base station based on their cutoff times. Mobile units having smaller cutoff times are assigned higher priority than mobile units having larger cutoff times. Available channels are assigned to each of the mobile units based on its priority within the queue. In addition to assigning available channels to mobile units requesting handoff, available channels are assigned to new calls. These assignments are communicated to the mobile units using modulator 370 and transmitting antenna 365. The modulator 370 and antenna 365 are also used to transmit voice data from the MTSO 350 to the mobile unit.

Figure 4:
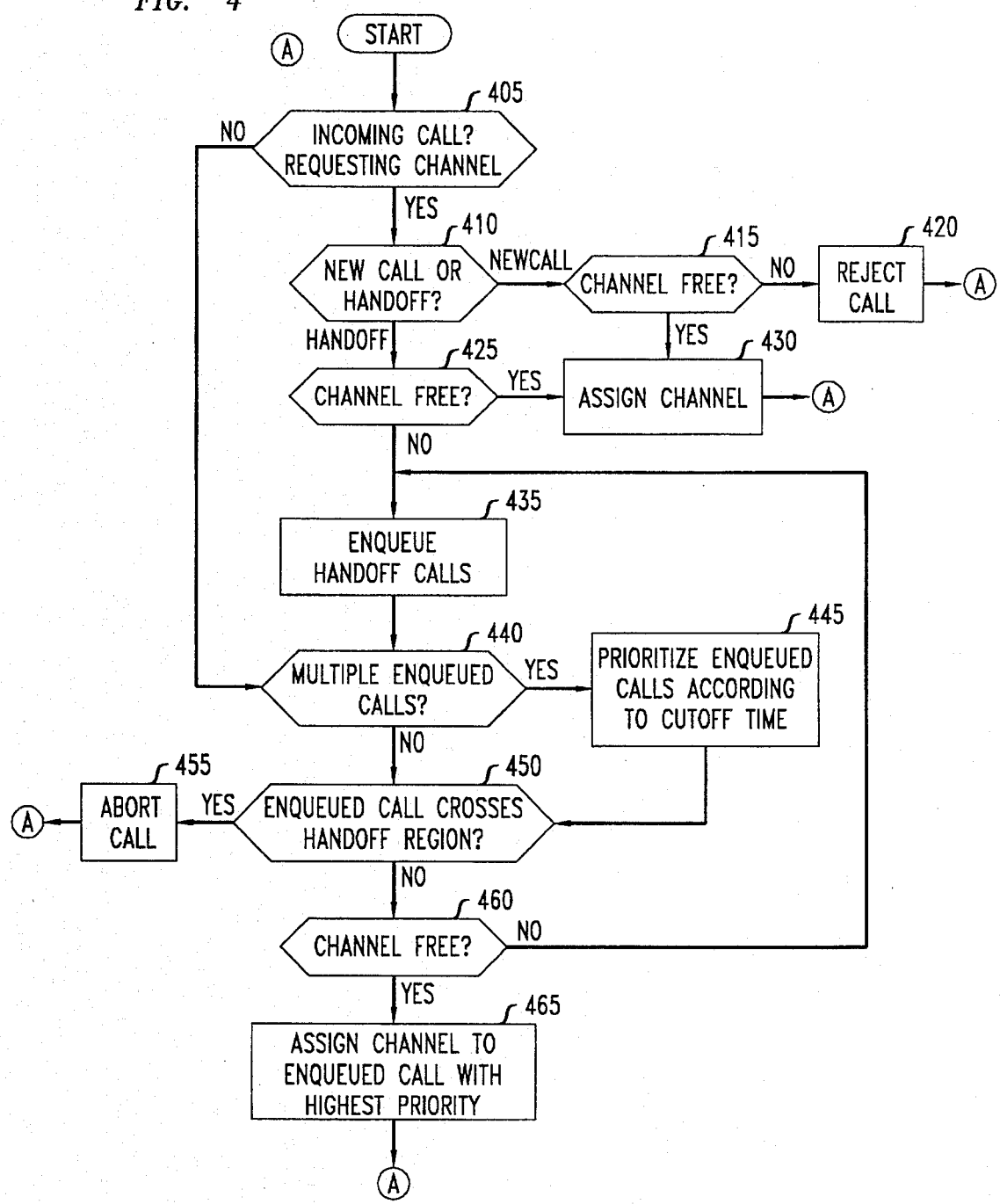
FIG. 4 is a flow chart illustrating the types of events which can trigger the assignment of a communication channel in the system of FIG. 1.

FIG. 4 is a flow chart describing the foregoing in more detail. When a mobile unit enters the new cell associated with base station 300, the mobile unit transmits a request to the base station to be assigned a channel (step 405). Base station 300 then determines whether the call is a new call or a request for a handoff (step 410). If the call is a new call, the base station determines whether any of its channels are free (step 415). If no channels are free, the call is rejected (step 420). If a free channel exists, the mobile unit is assigned the channel (step 430).

If a handoff is requested, base station 300 again determines if any of its channels are free (step 425). If a channel is free, the mobile unit is assigned a channel (step 430). If no channels are available, the handoff request is placed in a queue (step 435). Next, base station 300 determines if there is more than one handoff request in the queue (step 440). If multiple handoff requests exist, the handoff requests are prioritized based on a determination of which mobile unit will exit the handoff region first, which is based on the cutoff time for each mobile unit (step 445). In either case, a determination is made of whether any of the mobile units requesting a handoff have left the handoff region (step 450). If the mobile unit has left the handoff region and has not been assigned a new channel by the base station, the call is aborted (step 455).

If the mobile units are still contained in the handoff region, a determination is made of whether any channels have become available (step 460). Such a determination is periodically performed until a channel becomes available. Once a channel is available, the channel is assigned to the enqueued handoff request having the highest priority (step 465).

As described in detail below, the enqueued handoff requests arc prioritized based on a determination of the cutoff time which represents the time at which each mobile unit will exit the handoff region and will be cut off from service if a new channel assignment has not been made. Since the cutoff times arc determined dynamically based on periodic updated measurements by the mobile units, the order of the queue is subject to frequent change. For example, if a mobile unit drastically changes speed or direction, such a change would be reflected in the updated computation of the cutoff time and hence, affect its priority within the queue. Each mobile unit contains within its memory a power level threshold which represents the lowest power level the mobile unit can use to transmit and receive signals. If the power level transmitted by the old base station to the mobile unit falls below this value, communication between the mobile unit and the old base station will be terminated.

Figure 5:
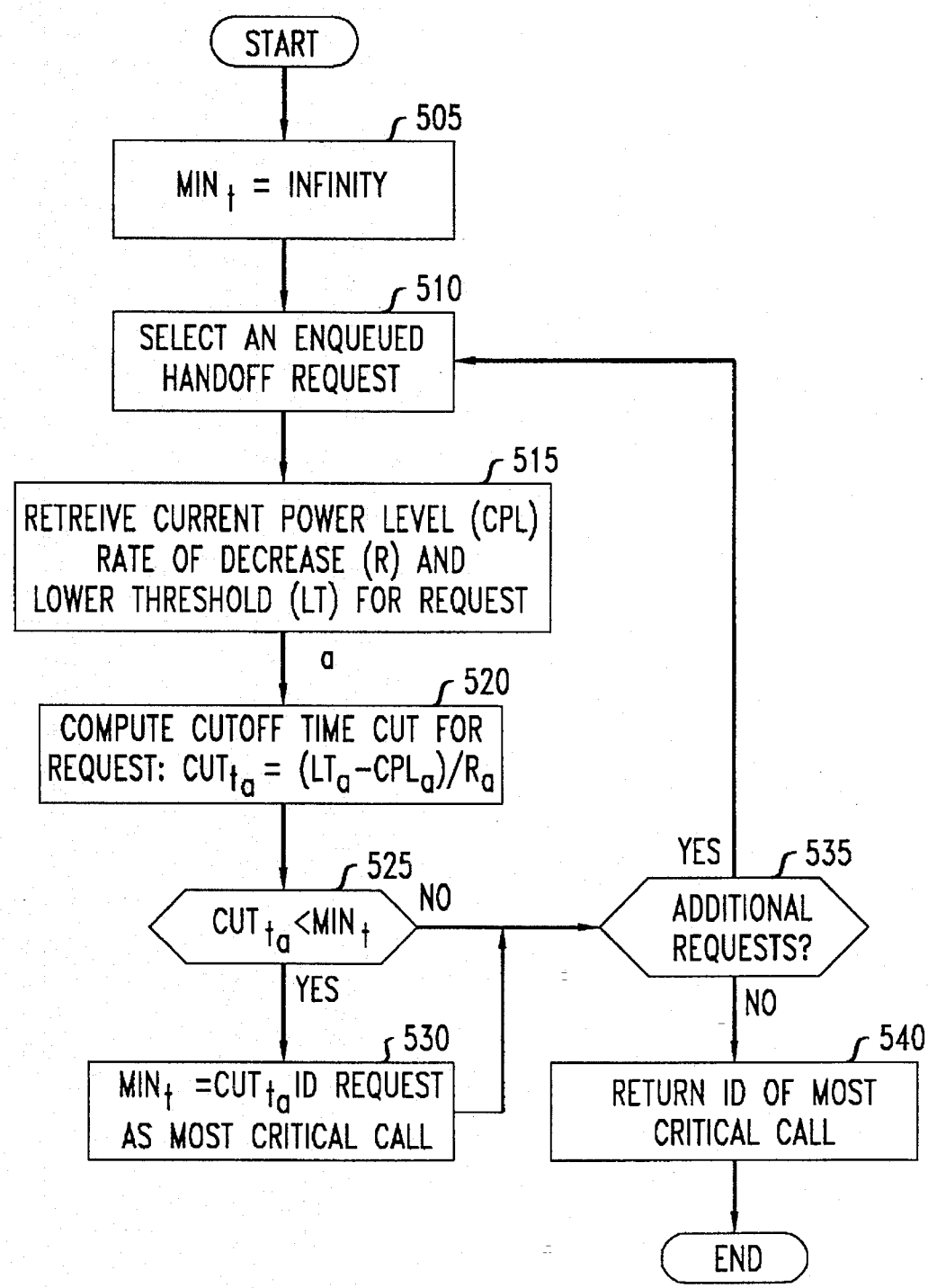
FIG. 5 is a flow chart depicting an illustrative method of determining handoff priority in accordance with the system shown in FIG. 4.

FIG. 5 illustrates a flow chart depicting a method of prioritizing the handoff requests. The minimum cutoff time $MIN_t$ is set to an initial value which is typically infinity (step 505). As the cutoff time is determined for each mobile unit requesting handoff, the minimum cutoff time is set equal to the smallest cutoff time. Next, base station 300 selects one of the enqueued handoff requests for which the cutoff time will be determined (step 510). The cutoff time for a particular mobile unit is determined by the following equation:

$$CUT_{t_a} = (LT_a - CPL_a)/R_a \quad (1)$$

where $CUT_{t_a}$ = cutoff time t for a mobile unit a $CPL_a$ = current power level transmitted by the old base station and detected by the mobile unit a $LT_a$ = lower threshold constant which depends on the sensitivity of the mobile's receiver and indicates the lowest power level transmitted by the old base station which can be detected by the mobile unit a before the mobile unit is cut off from the old base station $R_a$ = rate of decrease of power level detected by the mobile unit at time t such that $$R_a = -\frac{dP_a}{dt}.$$

The processor 340 retrieves the current power level (CPL) data, rate of decrease of power level (R) data and lower threshold (LT) data from memory 345 for the selected enqueued handoff request (step 515). The cutoff time for the selected enqueued handoff request is determined using Eq. 1 (step 520). Note that cutoff time is directly proportional to the current power level (CPL) and inversely proportional to the rate of change of power level. CPL is indicative of the distance of the mobile unit from the old base station, and the rate of change of power level is a function of the speed and direction of the unit as it is moving away from the old base station. Next it is determined if the cutoff time $CUT_{t_a}$ for the selected enqueued handoff request is less than the minimum cutoff time $MIN_t$ (step 525). If the cutoff time is less than the minimum cutoff time, the minimum cutoff time is set to $CUT_{t_a}$ and the mobile unit making the handoff request is identified as having the most critical state (step 530).

Next, it is determined whether them are any other enqueued handoff requests (step 535). If there are additional enqueued handoff requests steps 510–530 are repeated. If there are not any additional enqueued handoff requests, the identification of the mobile unit having the most critical state is transmitted to the processor (step 540). If a channel becomes available, the mobile unit having the most critical state will be assigned the channel.

It will be appreciated that those skilled in the art will be able to devise numerous and various alternative arrangements which, although not explicitly shown or described herein, embody the principles of the invention and are within its scope and spirit.

We claim:

1. A method of prioritizing handoff requests in a cellular system comprising the steps of:

receiving a plurality of handoff requests for assignment of communication channels from a plurality of mobile units which are projected to enter a second cell;

determining a projected cutoff time for each such handoff request, each projected cutoff time representing an estimate of a time at which the mobile unit corresponding to the associated handoff request will exit a handoff region formed by a first cell and the second cell;

arranging the handoff requests in a priority queue based on the cutoff time associated with each handoff request such that the request with the shortest cutoff time is given first priority in the queue; and assigning available communication channels to the mobile units requesting handoff requests in the order of the queue.

2. The method of claim 1 wherein said step of determining the cutoff time for the handoff request further comprises:

periodically sampling the power level transmitted by a base station located in a first cell to a mobile unit projected to enter the second cell;

determining the current power level transmitted by the base station located in the first cell to the mobile unit requesting handoff;

determining the rate of decrease between the power level currently sampled and power level previously sampled; and determining the cutoff time as a function of the current power level and rate of decrease of power level.

3. The method of claim 2 wherein the power level transmitted by the base station located in the first cell and received by the mobile unit is inversely proportional to the distance between the mobile unit and the base station of the first cell.

4. The method according to claim 2 wherein the rate of decrease between the power level currently sampled and the power level previously sampled is a function of the relative speed and direction at which the mobile unit is travelling away from the base station of the first cell.

5. The method of claim 2 wherein the step of determining the cutoff time is performed by the base station of the second cell.

6. A method of prioritizing handoff requests in a cellular system comprising the steps of:

receiving a plurality of requests for assignment of a communication channel from a plurality of mobile units located in a handoff region formed by a first cell and a second cell;

periodically sampling the power level transmitted by a base station located in the first cell to each mobile unit requesting a channel assignment;

determining the rate of change between a power level currently sampled and a power level previously sampled; and determining the cutoff time at which each mobile unit will exit the handoff region by calculating a ratio of the power level currently sampled to the rate of change of power level;

arranging the channel assignment requests in a priority queue based on the cutoff time such that the request having the shortest cutoff time is given first priority in the queue; and assigning available communication channels to the mobile units requesting handoff in the order of the queue.

7. The method according to claim 6 wherein the power level transmitted by the base station located in the first cell and received by the mobile unit is inversely proportional to the distance between the mobile unit and the base station.

8. The method according to claim 6 wherein the rate of change of the power level is a function of the relative speed at which the mobile unit is travelling away from the base station located in the first cell.

9. The method of claim 6 wherein the step of determining the cutoff time is performed by the base station located in the second cell.

* * * * *